(12) United States Patent
Sun et al.

(10) Patent No.: US 11,385,110 B2
(45) Date of Patent: Jul. 12, 2022

(54) OPTICAL MONITORING SYSTEM

(71) Applicant: CITY, UNIVERSITY OF LONDON, London (GB)

(72) Inventors: Tong Sun, London (GB); Kenneth Grattan, London (GB); Ye Chen, London (GB); Miodrag Vidakovic, London (GB); Matthias Fabian, London (GB); Fei Xiong, London (GB)

(73) Assignee: CITY, UNIVERSITY OF LONDON, London (GB)

( * ) Notice: Subject to any disclaimer, the term of this patent is extended or adjusted under 35 U.S.C. 154(b) by 215 days.

(21) Appl. No.: 16/477,375

(22) PCT Filed: Jan. 12, 2018

(86) PCT No.: PCT/EP2018/025006
§ 371 (c)(1),
(2) Date: Jul. 11, 2019

(87) PCT Pub. No.: WO2018/130427
PCT Pub. Date: Jul. 19, 2018

(65) Prior Publication Data
US 2020/0055401 A1  Feb. 20, 2020

(30) Foreign Application Priority Data
Jan. 12, 2017  (GB) .................... 1700573.7

(51) Int. Cl.
*G01L 1/24* (2006.01)
*B60L 5/20* (2006.01)
*B60L 5/24* (2006.01)

(52) U.S. Cl.
CPC .............. *G01L 1/246* (2013.01); *B60L 5/205* (2013.01); *B60L 5/24* (2013.01); *B60L 2200/26* (2013.01)

(58) Field of Classification Search
CPC ........ B60L 5/24; B60L 5/205; B60L 2200/26; B60L 5/18; B60L 5/19; B60L 5/20;
(Continued)

(56) References Cited

U.S. PATENT DOCUMENTS 6,125,216 A * 9/2000 Haran ..................... G01L 1/246
250/227.14
6,418,397 B1 * 7/2002 Brand ....................... B60L 5/28
702/168
(Continued)

FOREIGN PATENT DOCUMENTS

EP         1726472 A1    11/2006
WO    2006107278 A1    10/2006
(Continued)

OTHER PUBLICATIONS

International Search Report & Written Opinion, PCT/EP2018/025006, dated Jun. 7, 2018, 10 pages.

*Primary Examiner* — S. Joseph Morano
*Assistant Examiner* — Cheng Lin
(74) *Attorney, Agent, or Firm* — Taft Stettinius & Hollister LLP; Stephen F. Rost

(57) ABSTRACT

A monitoring system for an electric vehicle that draws current from a conductor by means of a current collector that contacts a conductor in operation of the electric vehicle. The monitoring system includes a plurality of sensor modules throughout the current collector, wherein each sensor module comprises a plurality of FBG (Fibre Bragg Grating) sensors. Sensors of each module are arranged in a geometric pattern that compensates for temperature induced wavelength changes in the FBG sensors of each module. An optical source illuminates each sensor module and an optical coupler optically couples the optical source to each sensor module. An optical signal interpretation module receives optical signals from each sensor module wherein the optical
(Continued)

signals are generated by the sensor modules in response to illumination of the sensor modules, wherein the interpretation module is configured to determine from the optical signals, a temperature-independent strain measurement for each sensor module.

19 Claims, 6 Drawing Sheets

(58) Field of Classification Search
CPC ... B60L 5/22; G01L 1/246; G01L 1/24; G01L 1/241; G01K 11/3206
See application file for complete search history.

(56) References Cited

U.S. PATENT DOCUMENTS

| | | | |
|---|---|---|---|
| 6,586,722 B1 * | 7/2003 | Kenny | G01L 1/246 |
| | | | 250/227.16 |
| 7,703,331 B2 * | 4/2010 | Magne | G01L 11/025 |
| | | | 73/800 |
| 10,584,959 B2 * | 3/2020 | Maul | G01B 11/165 |
| 2007/0000744 A1 | 1/2007 | Craig | |

FOREIGN PATENT DOCUMENTS

| | | | | |
|---|---|---|---|---|
| WO | 2014072436 A1 | 5/2014 | | |
| WO | WO-2014072436 A1 * | 5/2014 | ............ | G01L 1/246 |

* cited by examiner

OPTICAL MONITORING SYSTEM

This application is a U.S. national stage application under 35 U.S.C. § 371 of PCT International Application Serial No. PCT/EP2018/025006, which has an international filing date of Jan. 12, 2018, designates the United States of America, and claims the benefit of GB Application 1700573.7, which was filed on Jan. 12, 2017, the disclosures of which are hereby expressly, incorporated by reference in their entirety.

FIELD

This invention relates to an optical monitoring system, in particular to a monitoring system that includes a plurality of optical sensor modules.

In one envisaged implementation, the system disclosed may be utilised for monitoring a current collector, for example a collector of the type that is employed by an electric vehicle (such as a train or tram) to draw current from a conductor, for example an overhead conductor wire (known as a catenary) or a conducting rail. In other applications the teachings of the present invention may be employed to monitor other types of current collectors, for example current collectors employed in electrical motors and the like.

The teachings of the present invention are provided below in the context of a monitoring system for an electric locomotive that includes a pantograph to draw current from an overhead catenary. It should be noted, however, that this particular application is merely one illustrative application of the teachings of the invention and that many other applications exist. As such, the following description should not be considered to be a limitation of the scope of the present invention to the particular application described hereafter in detail.

BACKGROUND

The pantograph is a critical, roof-mounted part of a modern electric train, tram or bus that functions to collect current from an overhead catenary wire. Successful current collection requires a reliable pantograph-catenary contact with a steady force under all conditions, in particular against mechanical, dynamic and aerodynamic effects seen as the train travels along the line. Thus it is of critical importance to have real-time information of the contact conditions between the pantograph and catenary when the train is in operation. The contact force at the interface of pantograph-catenary varies as a function of speed and is documented in industrial standards, for example British Standard BS EN 50367.

However, the contact force must be steady to provide acceptable current-collecting efficiency. If the contact force is lower than that required, there is a power loss, for example, in the form of electric arcs. The high rate of arcing and continuous sparking can induce strong electromagnetic noise in the environment as well as electricity-induced wear. If the contact force is higher than that required, wear of the carbon blocks carried by the pantograph becomes an important issue due to the increased mechanical friction, thus resulting in a shortened lifetime of the pantograph.

As a consequence, the rail industry (in particular) is keen to be able to monitor the contact condition of the pantograph against catenary. However, technical challenges arise, inter alia, from the pantograph's harsh working conditions as the pantograph is powered at 25 kV and trains can move at speeds of up to 350 km/h. Also, the high electromagnetic interference requires any instruments installed for measurement to be appropriately insulated, which tends to make the whole system more complex due to the added mass and the measurement error contributed by the added instrumentation.

More recently optic fibre based sensors have shown significant advantages over previously proposed electrical sensors, due to their intrinsic insulator nature and their small size and light weight which renders them suitable for being integrated or retrofitted into the pantograph for non-invasive remote condition monitoring.

Two types of optical fibre sensing systems have been widely reported for monitoring pantograph-catenary contact force, using either fibre Bragg grating (FBG) based or interferometric based approaches. The FBG-based technique requires temperature compensation, when it is used for strain/force measurement as FBGs are sensitive to both strain and temperature. As a result, a significant amount of research effort has been focused on temperature compensation schemes in order to achieve an accurate measurement of the contact condition at the pantograph-catenary interface.

Camolli et al reported the use of two fibres (see: L. Comolli, G. Bucca, M. Bocciolone and A. Collina. 2008. First results from in-line strain measurements with FBG sensors on the pantograph collector of underground trains. *Proceeding of SPIE*. Vol. 7726), each carrying a single FBG only, for the pantograph contact force measurement, with one FBG being used for strain measurement and the other for temperature compensation. The FBG sensor for temperature compensation is mounted in an orthogonal direction to that for strain measurement and at a position where the strain values are the lowest. This approach is based on the assumption that the temperature distribution in the carbon collector block is uniform along the pan-head, but as this is not true in reality this approach will likely lead to inaccurate readings.

Wagner et al reported the use of an aluminium box (see: R. Wagner, D. Maicz, W. Viel, F. Saliger, C. Saliger, R. Horak and T. Noack. 2014. A fibre optic sensor instrumented pantograph as part of a continuous structural health monitoring system for railway overhead lines. 7th European Workshop on Structural Health Monitoring) not just for protecting the FBG sensors from the harsh environment, but also for confining three FBG sensors within a small footprint (box), with one free FBG (strain-free) being used for temperature measurement/compensation and the other two for strain measurement. Each pantograph pan head is provided with two aluminium boxes, and as each pantograph typically includes two pan heads there are therefore 12 FBG sensors that need to be connected to the interrogation equipment using 4 fibre patch leads. This complexity aside, the proposal is disadvantageous as the addition of 4 aluminium boxes to the pan-heads of the pantograph increases the mass of the pan-heads and hence the aerodynamic force when a train moves at a high speed.

European Patent No. EP 1975584 discloses the use of two FBGs in a "push-pull" configuration with one being configured in a 'tensile' condition and the other in 'compression' when the contact force is applied. The acting force can thus be determined by cancelling out the temperature effect and doubling the strain measurement sensitivity. However, this is only valid when the two FBGs are subject to the same temperature effects, which is not necessarily true in reality.

All the previously proposed FBG-based techniques described above have either used the absolute wavelength shift of a thermal grating or their differential value to measure temperature for compensation. However, these approaches have been shown to be ineffective inter alia for the following reasons:

The temperature sensitivity of an FBG integrated into a pantograph is ~30 pm/° C. (for a free FBG, it is ~10 pm/° C. but it is not very practical) and is approximately 30 times higher than that of its strain/force sensitivity (which is ~1 pm/N). As a result, the Bragg wavelength shift of a FBG caused by a temperature change of 1° C. is roughly equivalent to that of ~30 N in force.

The static contact force at low speed is around 90 N, therefore the wavelength shift induced by contact force is equivalent to that of a 3° C. temperature variation. In reality, there is a wide temperature variation, ranging from −30° C. to +45° C. As a consequence, the received strain/force signal tends to be overwhelmed by the 'noise' (temperature) signal.

In reality, it is technically challenging (and potentially impossible) to use the absolute or differential wavelength shift compensation method to achieve effective temperature compensation as the temperature measurement error is required to be within ±3° C.—a level of accuracy that is difficult to attain using thermocouples as references for calibration and a typical swept-laser based FBG interrogator with a resolution of ±2 pm.

The present invention has been devised with the foregoing problems in mind.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Illustrative implementations of the teachings of the present invention will now be provided, and particular reference will be made to a monitoring system for an electric locomotive that includes a pantograph to draw current from an overhead conductor. As aforementioned, it should however be noted that this particular application is merely one illustrative application of the teachings of the invention and that many other applications exist. As such, the following description should not be considered to be a limitation of the scope of the present invention to the particular application that is described hereafter in detail.

Figure 1:
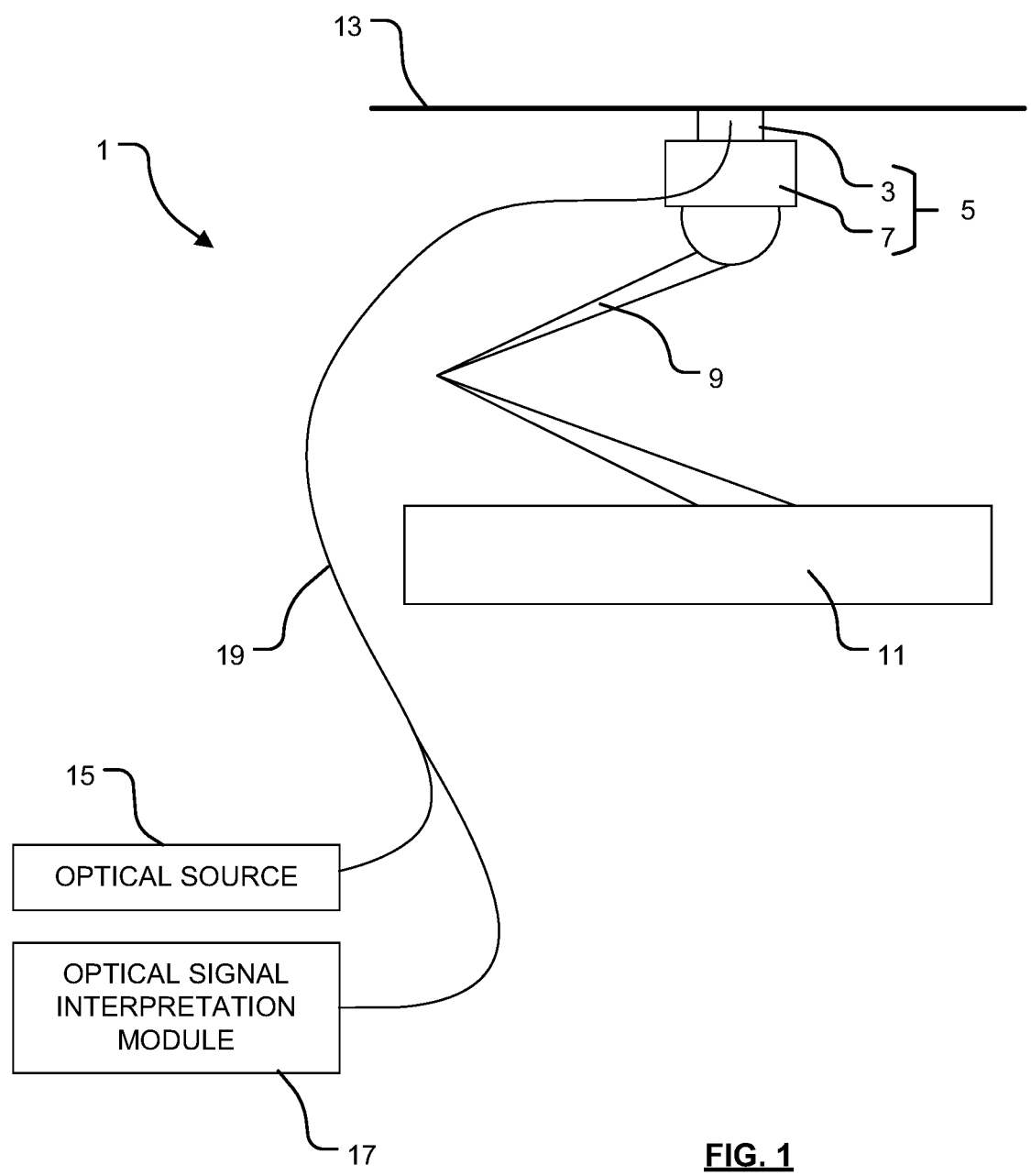
FIG. 1 is a schematic representation of a monitoring system implementing the teachings of the present invention.

With this proviso in mind, reference will now be made to FIG. 1 in which there is depicted a schematic representation of the monitoring system 1. The system comprises a conducting block 3 and a carrier 7 (otherwise collectively known as a "pan head") for the block 3 that together form a current collector 5.

The current collector 5 is coupled to a mechanism 9 for raising or lowering the carrier 7 and conducting block 3 with respect to an electric vehicle 11. The mechanism 9 is configured to urge the conducting block 3 into abutment, in this particular arrangement, with an overhead conducting line (OCL) 13 so that current may be drawn from the OCL 13 and supplied to the vehicle 11.

The conducting block 3 can be of any suitable conducting material. For example, in one envisaged arrangement the conducting block is at least principally of carbon. The conducting block 3 includes a plurality of sensor modules (not shown in FIG. 1) that are, in this particular arrangement, coupled in series to one another and to an optical source 15 and an optical signal interpretation module 17 by means of optical coupling means that comprises an optic fibre 19.

In another envisaged implementation the optical coupling means comprises a plurality of optic fibres with each said fibre of said plurality coupling a said sensor module of said plurality to the optical source 15 and the optical signal interpretation module 17.

In a preferred implementation, the optical source 15 comprises a broadband (i.e. wide spectrum) light source, for example a broadband LED light source. This arrangement is particularly preferred as it enables individual sensor modules to be tuned to respond to illumination by the source by emitting signals in a wavelength band distinct from those allocated to other sensor modules. In another envisaged implementation the light source could comprise a narrow wavelength source, such as a laser light source, and in this configuration signals from respective sensor modules may be distinguished from one another on the basis of the time of flight of signals between the source and the modules, that is to say the time elapsed between illumination of the sensor modules by the source and the receipt of signals back from the individual sensor modules.

Figure 2:
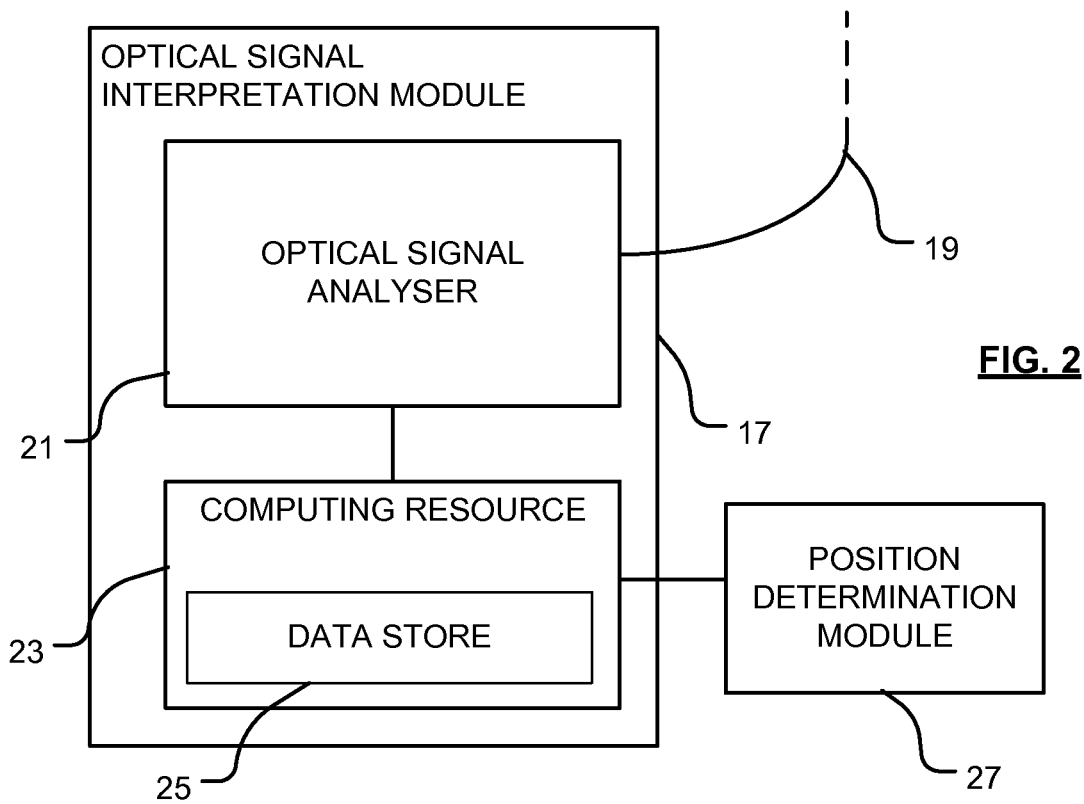
FIG. 2 is a schematic representation of an optical signal interpretation module and optional attached components.

Referring now to FIG. 2, the optical signal interpretation module 17 can have many different forms, but in one envisaged arrangement the module 17 comprises an optical signal analyser 21 coupled to the optic fibre 19, and a computing resource 23 such as a personal computer (PC) or equivalent. In the arrangement depicted in FIG. 2, the computing resource includes an integral data store 25 for the storage of data, but it will be appreciated that the data store may be external to the module 17.

In a particularly preferred arrangement, the computing resource 23 is coupled to a position determination module 27 that may comprise a GPS device that is adapted to determine the position of the module (and hence any vehicle to which it is affixed) by triangulation using signals from satellites orbiting the earth. Other position determination modules, such as a module that implements dead-reckoning functionality, may instead be provided without departing from the scope of the invention.

The presently preferred embodiment of the invention addresses the disadvantages described above by providing a plurality of discrete FBG sensor arrays, where each array comprises a plurality of FBG sensors arranged in a geometric pattern. In a particularly preferred arrangement, each array comprises three FBG sensors arranged in a triangle, referred to herein as a "rosette layout" of FBGs. This arrangement allows the correlation of adjacent FBGs, rather than the absolute (or differential) wavelength shift of a thermal FBG, for temperature compensation.

Figure 3:
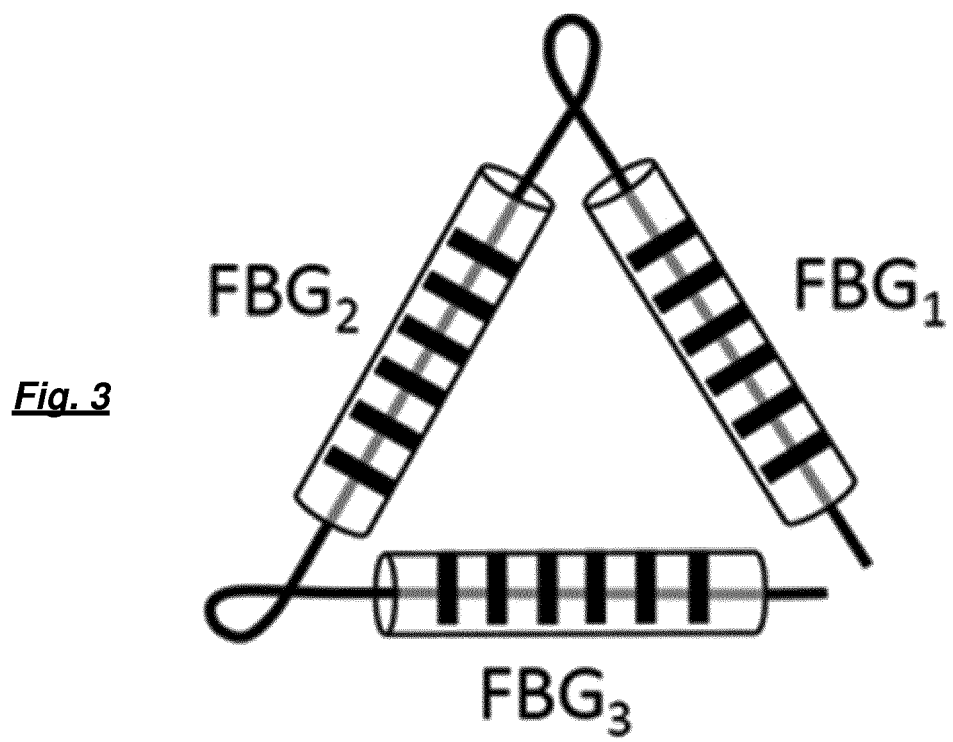
FIG. 3 is a schematic representation of a preferred FBG arrangement.

In the preferred embodiment a fibre that comprises nine FBG-based sensors which are arranged in three-sensor rosettes is integrated into each pan-head (for example, adhered to the pan-head so that the rosettes lie between the pan-head and the carbon collector) and connected to the interrogation unit for data logging. FIG. 3 shows a typical rosette layout that avoids complex cable routing down the pantograph arm and allows adequate connection of the fibres to the interrogation system.

The sensors are arranged in a common plane (i.e. laid flat on the pan-head of the pantograph) at an angle of approximately 60° to one another as a part of each so-called sensor rosette. In this embodiment, each rosette includes three FBGs, each being sensitive to both strain (force caused) and temperature changes. Other arrangements will be apparent to persons of ordinary skill in the art. In this particular arrangement, the corresponding wavelength shift $\Delta\lambda_i$ of FBG i (i=1, 2, 3) can be given by:

$$\Delta\lambda_i = \Delta\lambda_{Ti} + \Delta\lambda_{Fi} = S_{Ti} \times \Delta T + S_{Fi} \times F \quad (1)$$

where $\Delta\lambda Ti$ and $\Delta\lambda Fi$ are the wavelength shifts caused by temperature and force change, respectively; STi and SFi are the temperature and force sensitivity, respectively; and $\Delta T$ and F are the temperature variation and effective force applied on the rosette.

With reference to FIG. 3, if a force is applied perpendicular to FBG3, the force sensitivity experienced by FBG3 will be different to that experienced by FBG 1 and FBG 2. However, their temperature performance (trend) will be similar on account of their relative proximity to one another (as evidenced in the abundance of data that we have collected experimentally). Thus Equation (1) can be further expanded as follows:

$$\Delta\lambda_1 = \Delta\lambda_{T1} + \Delta\lambda_{F1} = S_{T1} \times \Delta T + S_{F1} \times F$$

$$\Delta\lambda_3 = \Delta\lambda_{T3} + \Delta\lambda_{F3} = S_{T3} \times \Delta T + S_{F3} \times F \quad (2)$$

Assuming the temperature and force sensitivities of FBGs 1 and 3 are given by:

$$S_{T1} = C_{T13} \times S_{T3}$$

$$S_{F1} = C_{F13} \times S_{F3} \quad (3)$$

where $C_{T13}$ and $C_{F13}$ are the correlation coefficients of temperature and force sensitivities of the two FBGs, respectively; the effective force applied on the rosette is given by:

$$F = \frac{\Delta\lambda_1 - C_{T13}\Delta\lambda_3}{(C_{F13} - C_{T13})S_{F3}} \quad (4)$$

As is indicated clearly in Equation (4), the temperature induced wavelength shift is no longer included in the equation used for the calculation of the applied force F. In other words, temperature compensation has been successfully achieved.

Figure 4:
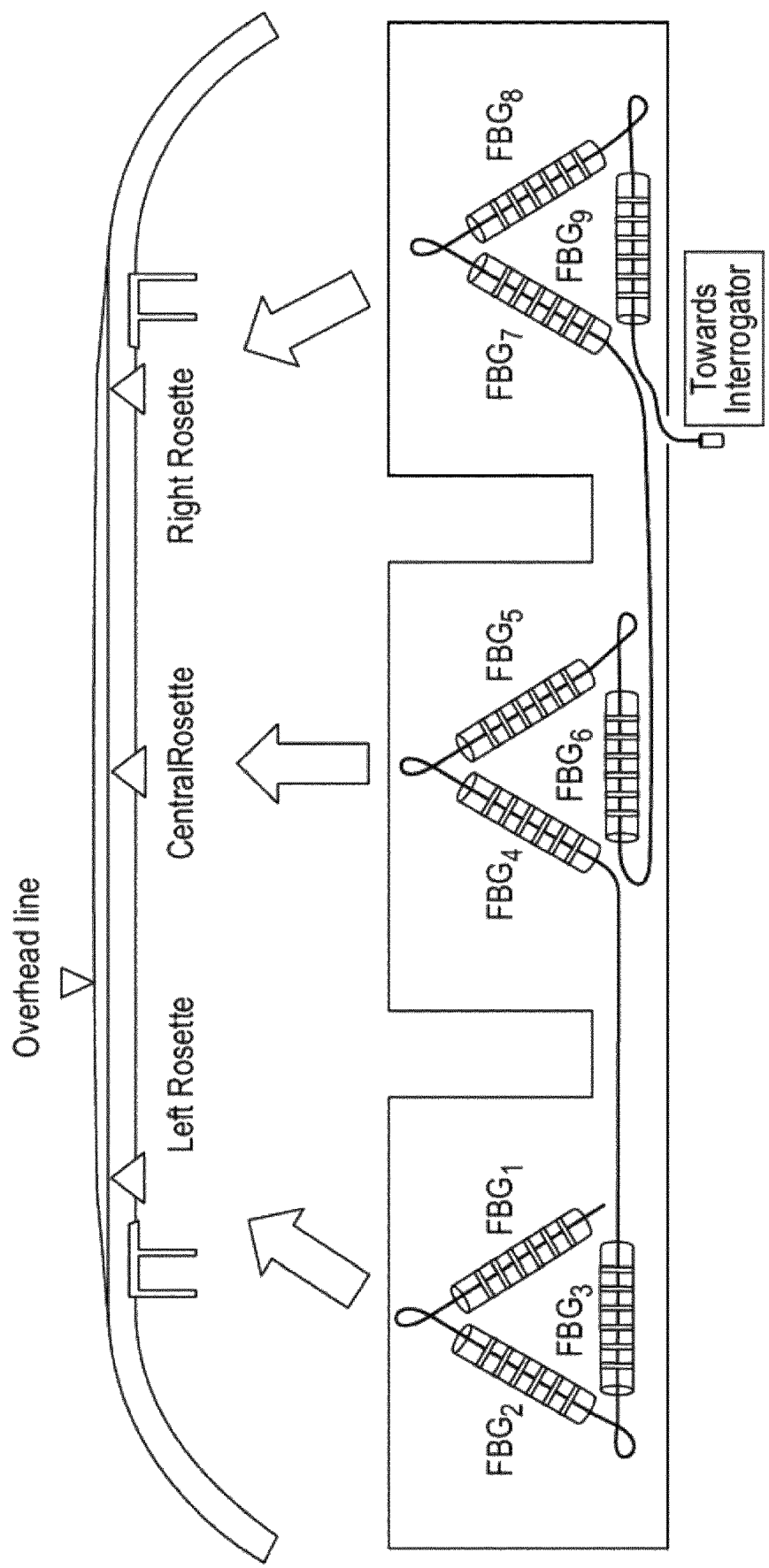
FIG. 4 is a schematic illustration of a preferred FBG layout.

In order to provide accurate information of the contact force and contact location of the pantograph against the catenary, three FBG sensor rosettes are integrated into the aluminium bottom of a pan-head at three different locations, labelled respectively left, central and right, as illustrated in FIG. 4. In the preferred arrangement, the areas which are covered with strain rosettes are spaced by 27 cm from the central rosette. The schematic diagram of the arrangement of three rosettes and the fibre routing on the pan-head is shown in FIG. 2.

Figure 5:
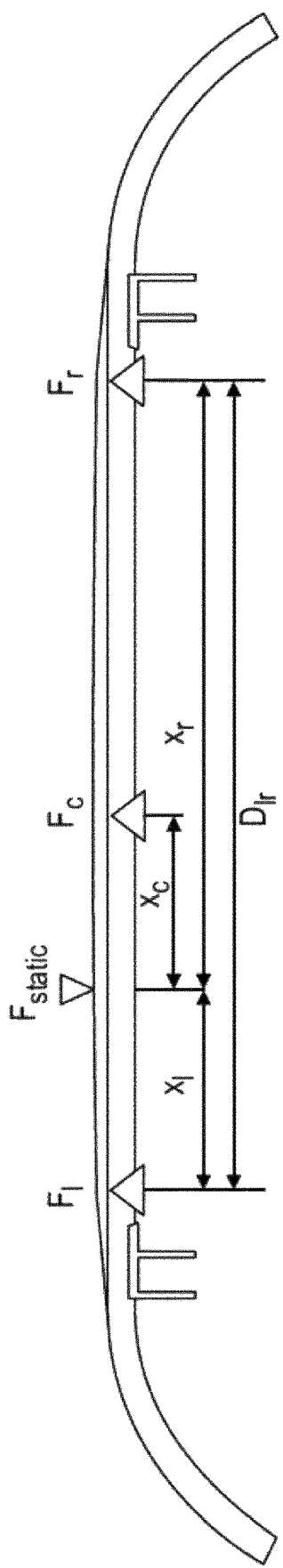
FIG. 5 is a schematic representation of the static force applied to a pan-head of a pantograph.

When a static force, $F_{static}$, is applied on the pan-head, the contact force that each rosette 'senses' is termed $F_l$, $F_c$ and $F_r$ respectively as shown in FIG. 5 and each can be expressed using Equation (4), with temperature effects having been fully compensated. The distance of the overhead wire with reference to these three rosettes can thus be labelled $x_l$, $x_c$ and $x_r$, as illustrated in FIG. 5.

Figure 6:
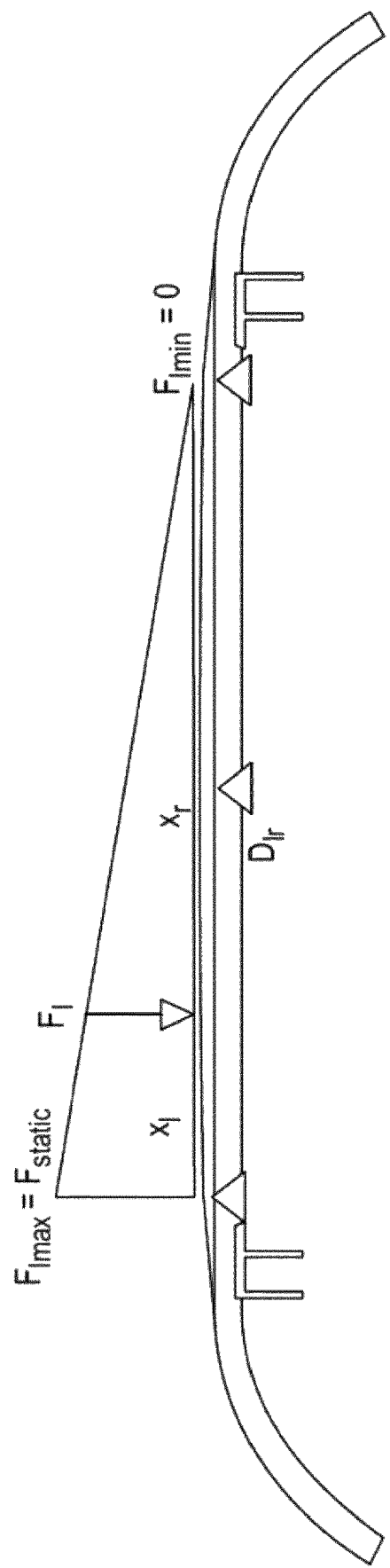
FIG. 6 schematically represents the relationship between the force measured by an FBG array versus the distance between the array and the applied force.

The contact force measured by each rosette, however, is linearly proportional to its distance to the location of the static force applied. As illustrated in FIG. 6, when the static force is applied on top of the left rosette, the left rosette measured force is equal to the static force ($F_{lmax} = F_{static}$) However, when the static contact force moves to the right side, $F_l$ will decrease linearly until it reaches $F_{lmin} = 0$ when the overhead line is located on top of right sensor rosette. This relationship, as shown in FIG. 6, can be described as follows:

$$\frac{F_l}{F_{static}} = \frac{D_{lr} - x_l}{D_{lr}} = 1 - \frac{1}{D_{lr}}x_l \quad (5)$$

$$r_l = \frac{1}{D_{lr}}$$

is considered as a coefficient in relation to the left rosette. Similarly, the right and centre rosettes will have coefficients of $$r_l = \frac{1}{D_{lr}} \text{ and } r_c = \frac{1}{D_{lr}/2}.$$

Therefore, the contact force measured by both the left and right rosettes can thus be described as follows:

$$F_l = F_{static} \times (1 - r_l x_l)$$

$$F_r = F_{static} \times (1 - r_r x_r)$$

$$x_l + x_r = D_{lr} \quad (6)$$

This allows the calculation of the location of the static force applied with reference to right (Equation (7)) and left (Equation (8)) rosettes, as follows:

$$x_r = \frac{F_l}{F_l + F_r}D_{lr} \quad (7)$$

$$x_l = \frac{F_r}{F_l + F_r}D_{lr} \quad (8)$$

During operation of the train, the overhead line tends to be primarily located in the central region of the pan-head. Therefore, it is proposed to use the central rosette to measure the static force applied, based on the location information derived from Equations (7) and (8). If the static force is applied on the left zone, i.e. $x_l \leq D_{lr}/2$, $x_c$ is given by:

$$x_c = \frac{1}{2}D_{lr} - x_l \quad (9)$$

If the static force is applied on the right zone, i.e. $x_l > D_{lr}/2$, $x_c$ is given by:

$$x_c = x_l - \frac{1}{2}D_{lr} \tag{10}$$

As a result, the static force can be calculated using equation (11).

$$F_{static} = \frac{F_c}{1 - r_c x_c} \tag{11}$$

Figure 7:
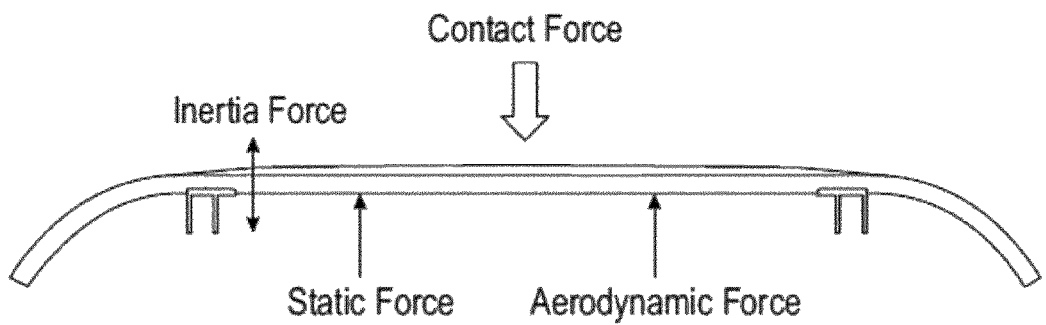
FIG. 7 is an illustration of the different forces acting on a pantograph.

FIG. 7 illustrates the forces that are acting on a pantograph. The contact force comprises the vertical static force, the inertial forces and the aerodynamic force and thus can be expressed using the following formula, defined in BS EN 50317 [14]:

$$F_{contact} = F_{static} + F_{inertial} + F_{aero} \tag{12}$$

where, $F_{contact}$=contact force; $F_{static}$=static force; $F_{inertial}$=inertial force and $F_{aero}$=aerodynamic force.

$F_{static}$ is measured using Equation (11) based on the data obtained from the FBG rosettes as described above. $F_{inertial}$ can be measured using FBG accelerometers, which can be installed into the support springs of the pan-head to capture the dynamic displacement of the pan-head. Based on the measured acceleration and the mass of the pan-head, the inertial force can be calculated as follows:

$$F_{inertial} = \sum_{k=1}^{n} m_k a_k \tag{13}$$

$$m_k = \frac{m_{head}}{n} (k = 1, 2 \ldots n) \tag{14}$$

where, $m_{head}$ is the mass of the pan-head, n is the number of accelerometers, and $a_k$ is the measured acceleration by accelerometer k.

$F_{aero}$ is velocity-dependent and can be estimated by:

$$F_{aero} = C_{aero} v^2 \tag{15}$$

where, $C_{aero}$ is the coefficient which can be obtained through extensive wind tunnel simulation tests, against standard flow meters.

Figure 8:
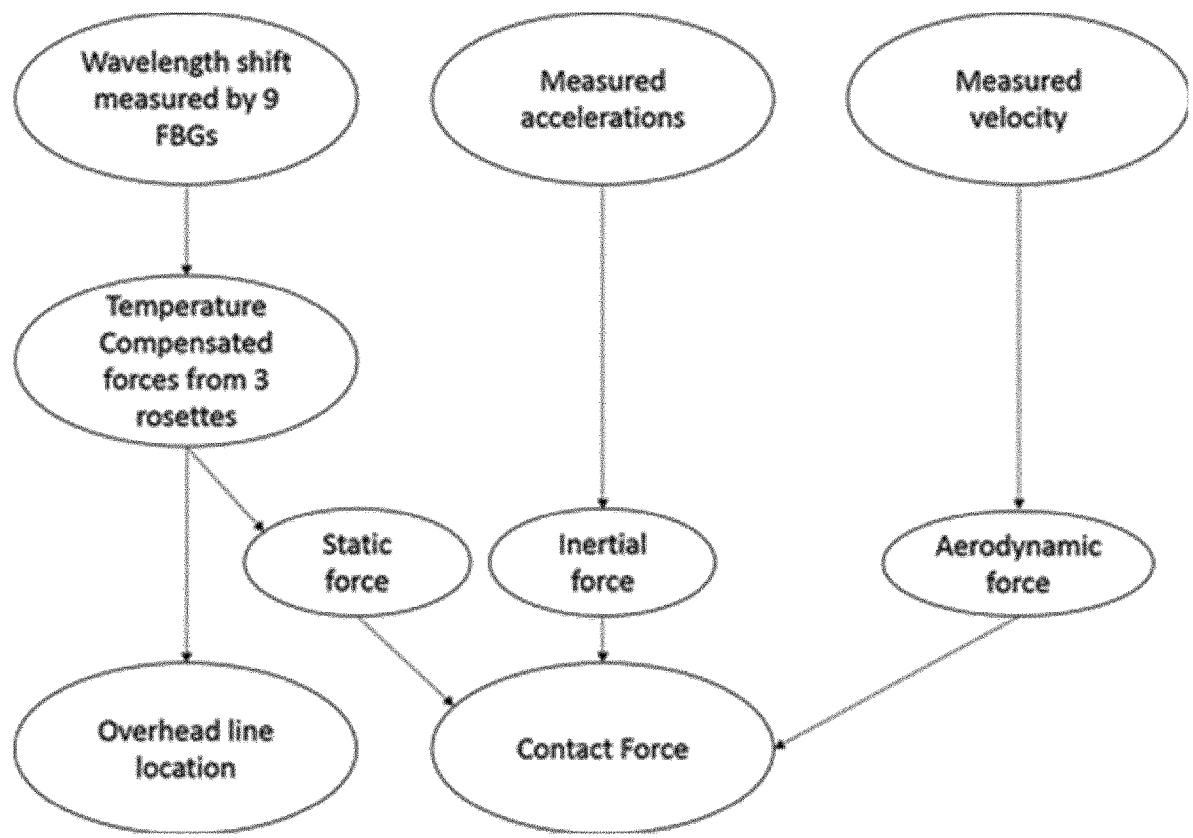
FIG. 8 is a flowchart illustrating the development of contact force measurement software.

The overall contact force measurement process can thus be summarized using a flow chart as shown in FIG. 8, showing the underpinning methodology used for the propriety software development for the contact force measurement.

Equation (16) summarise the overall contact force calculation which consists of static force, inertial force and aerodynamic force:

$$F_{contact} = \frac{F_c}{1 - r_c x_c} + \sum_{k=1}^{n} m_k a_k + C_{aero} v^2 \tag{16}$$

Figure 9:
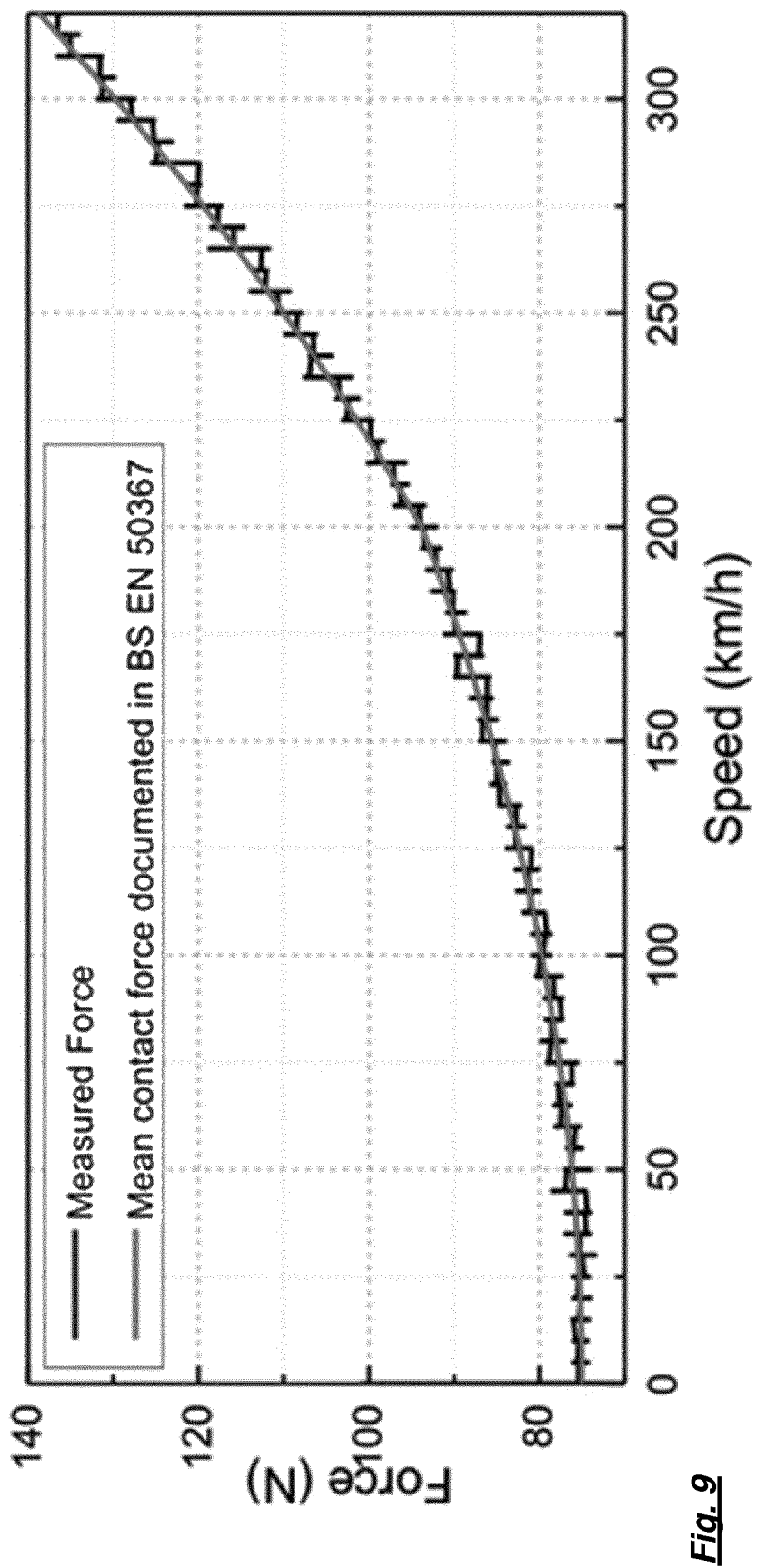
FIG. 9 is a graph of measured force versus mean contact force documented in BS EN 50367.

The novel sensing approach described above has enabled real-time measurement and the measurement data obtained would facilitate a closed-loop control of the pantograph, both to avoid extreme scenarios (such as dewirement) occurring and to maintain a contact force required and documented in industrial standards for power efficiency. To illustrate its effectiveness, FIG. 9 shows a cross-comparison between the measured contact force of a pantograph with built-in sensors and closed-loop control, and the required contact force documented in BS EN 50367 when a train is running at different speeds. It is apparent from FIG. 9 that a very good agreement has been reached.

Figure 10:
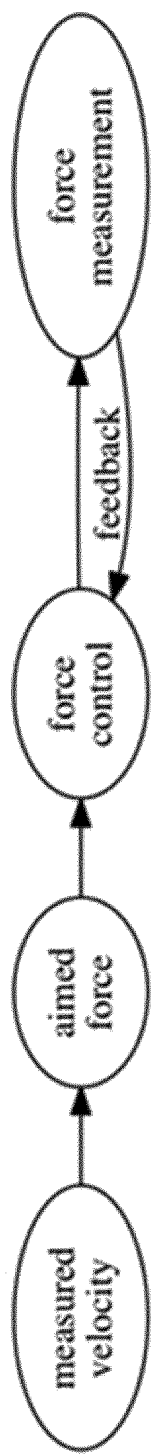
FIG. 10 is a chart depicting a closed-loop pantograph control system.

The required contact force is derived from the standards document and is related to the speed of a train. The real time measured force is used as a feedback to the control valve in order to adjust the force to its required value. The control is using PID (proportional-integral-derivative) technique and the system continuously calculates an error value e(t) which is the difference between the required and measured contact forces and applies a correction based on proportional, integral, and derivative terms. The control system attempts to minimize the error over time by adjusting the input voltage of control valve wired to the pantograph. The PID system can be described as:

$$V(t) = K_p e(t) + K_i \int_0^t e(t)\delta t + K_d \frac{\delta e(t)}{\delta(t)} \tag{17}$$

$$e(t) = F_{aim} - F_{contact} \tag{18}$$

where V(t) is the correction voltage of the control valve. $K_p$, $K_i$ and $K_d$ are coefficients of the proportional, integral and derivative terms that are obtained through calibration. $F_{aim}$ is the required contact force. The difference between the aimed and measured forces, e(t), is thus reduced by varying the input voltage of the control valve. The flow chart of the control system is shown in FIG. 10.

It will be apparent from the foregoing that the teachings of the present invention provide an enhanced optical monitoring system that addresses drawbacks associated with previously proposed systems. The system may include a position sensing module operable to determine the geographic position of the pantograph (so that any detected defects in the catenary can be logged). A variety of additional enhancements will be apparent to persons of ordinary skill in the art.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the spirit and scope of the invention.

It should also be noted that whilst the foregoing sets out particular combinations of features, the scope of the present invention is not limited to the particular combinations described herein, but instead extends to encompass any combination of features herein disclosed. In addition, that whilst embodiments of the present invention have been described above in the context of software modules that are executable by a processor, it should be noted that the scope of the present invention is not limited to an implementation of the teachings of the invention in software. Rather, the skilled person will immediately appreciate that the functionality described herein may equally be implemented in hardware (for example, by means of a plurality of application specific integrated circuits (ASICS)) or, indeed, by a mix of hardware and software.

The invention claimed is:

1. A monitoring system for an electric vehicle that draws current from a conductor by means of a current collector that contacts a conductor in operation of the vehicle, the system comprising:
   a plurality of sensor modules distributed at spaced intervals throughout the current collector, wherein each sensor module comprises a plurality of FBG (Fibre Bragg Grating) sensors orientated so as to be at least generally co-planar with a surface of the current collector that contacts the conductor in operation of the vehicle, each said module being comprised only of FBG sensors that are responsive in use to both temperature and strain, the sensors of each said sensor module being arranged in a geometric pattern that compensates for temperature induced wavelength changes in the FBG sensors of each sensor module;
   an optical source for illuminating each said sensor module;
   an optical coupler configured to optically connect said optical source to each said sensor module; and
   an optical signal interpretation module configured to receive optical signals from each said sensor module via said optical coupler, said optical signals being generated by said sensor modules in response to illumination of said sensor modules by said optical source, said interpretation module being configured to be capable of determining from a correlation of optical signals from the plurality of FBG sensors of each said sensor module a temperature-independent strain measurement for each said sensor module.

2. A system according to claim 1, wherein said interpretation module is further configured to be capable of determining the position of the conductor relative to the surface of the current collector that contacts said conductor.

3. A system according to claim 1, wherein each said module comprises at least three sensors.

4. A system according to claim 3, wherein each said module comprises 3 sensors arranged in a triangle, each said sensor being arranged at an angle of approximately 60 degrees to neighbouring sensors.

5. A system according to claim 1, wherein the current collector comprises a support (pan head) and a conductor block mounted thereon, the conductor block being arranged to contact the conductor in operation of the vehicle.

6. A system according to claim 5, wherein said conductor block is of Carbon.

7. A system according to claim 5, wherein said plurality of sensor modules are provided between said support and conductor block of said current collector.

8. A system according to claim 7, comprising three sensor modules, a first sensor module roughly centrally located within said current collector, and second and third sensor modules located to either side of said centrally located first module.

9. A system according to claim 1, further comprising a position determining module (such as a GPS module) for determining the geographical position of the electric vehicle.

10. A system according to claim 1, further comprising a data store configured to store data.

11. A system according to claim 10, wherein said data store is configured to store one or more of: temperature data, strain data, conductor position data and vehicle position data.

12. A system according to claim 1, wherein said optical coupler comprises a plurality of optic fibres, a said fibre of said plurality of fibres being coupled to a said sensor module of said plurality of sensor modules.

13. A system according to claim 1, wherein said optical coupler comprises an optic fibre, said sensor modules being optically coupled together and to said source by said optic fibre.

14. A system according to claim 13, wherein said signal interpretation module is configured to distinguish between individual sensor modules of said plurality of sensor modules on the basis of the time between illuminating said sensor modules with said source and the time of receipt of signals from each said module.

15. A system according to claim 13, wherein each said sensor module is configured to generate a response in a predetermined unique wavelength/frequency range and said signal interpretation module is configured to distinguish between signals from respective sensor modules by determining in which said wavelength/frequency range said signals fall.

16. A current collector for use with the system of claim 1, said current collector comprising a support and a conducting block mounted on said support, said plurality of sensor modules being provided between said support and said conducting block.

17. A system according to claim 1, further comprising a processor operable to determine the strain applied to said current collector, said processor being coupled in a feedback loop to means operable to increase or decrease the extent to which said current collector bears upon said conductor.

18. A monitoring system for an electric vehicle that draws current from a conductor by means of current collector means which contacts a conductor in operation of the vehicle, the system comprising:
   a plurality of sensor module means distributed at spaced intervals throughout the current collector means, wherein each sensor module means comprises a plurality of FBG (Fibre Bragg Grating) sensor means orientated so as to be at least generally co-planar with a surface of the current collector means that contacts the conductor in operation of the vehicle, each said sensor module means being comprised only of FBG sensor means that are responsive in use to both temperature and strain, the sensor means of each said sensor module means being arranged in a geometric pattern that compensates for temperature induced wavelength changes in the FBG sensor means of each sensor module means;
   optical source means for illuminating each said sensor module means;
   optical coupler means configured to optically connect said optical source means to each said sensor module means; and
   optical signal interpretation means configured to receive optical signals from each said sensor module means via said optical coupler means, said optical signals being generated by said sensor module means in response to illumination of said sensor module means by said optical source means, said optical signal interpretation means being configured to capable of determining from said optical signals a temperature-independent strain measurement for each said sensor module means.

19. A monitoring system for an electric vehicle that draws current from a conductor by means of a current collector that contacts a conductor in operation of the vehicle, the system comprising:
   a plurality of sensor modules for distribution at spaced intervals throughout the current collector, wherein each sensor module comprises three FBG (Fibre Bragg Grating) sensors orientated so as to be at least generally co-planar with a surface of the current collector that contacts the conductor in operation of the vehicle, each said module being comprised only of FBG sensors that are responsive in use to both temperature and strain, the sensors of each said sensor module being arranged in a triangular pattern that compensates for temperature induced wavelength changes in the FBG sensors of each sensor module, each said sensor of each said sensor module being at approximately 60 degrees to neighbouring sensors of that sensor module;

an optical source for illuminating each said sensor module;

an optical coupler configured to optically connect said optical source to each said sensor module; and an optical signal interpretation module configured to receive optical signals from each said sensor module via said optical coupler, said optical signals being generated by said sensor modules in response to illumination of said sensor modules by said optical source, said interpretation module being configured to be capable of determining from a mathematical correlation of said optical signals from the plurality of FBG sensors of each said sensor module a temperature-independent strain measurement for each said sensor module.

\* \* \* \* \*